Oct. 11, 1932.   H. J. MURPHY   1,881,857
LUBRICATING APPARATUS
Filed Jan. 9, 1926   2 Sheets-Sheet 1
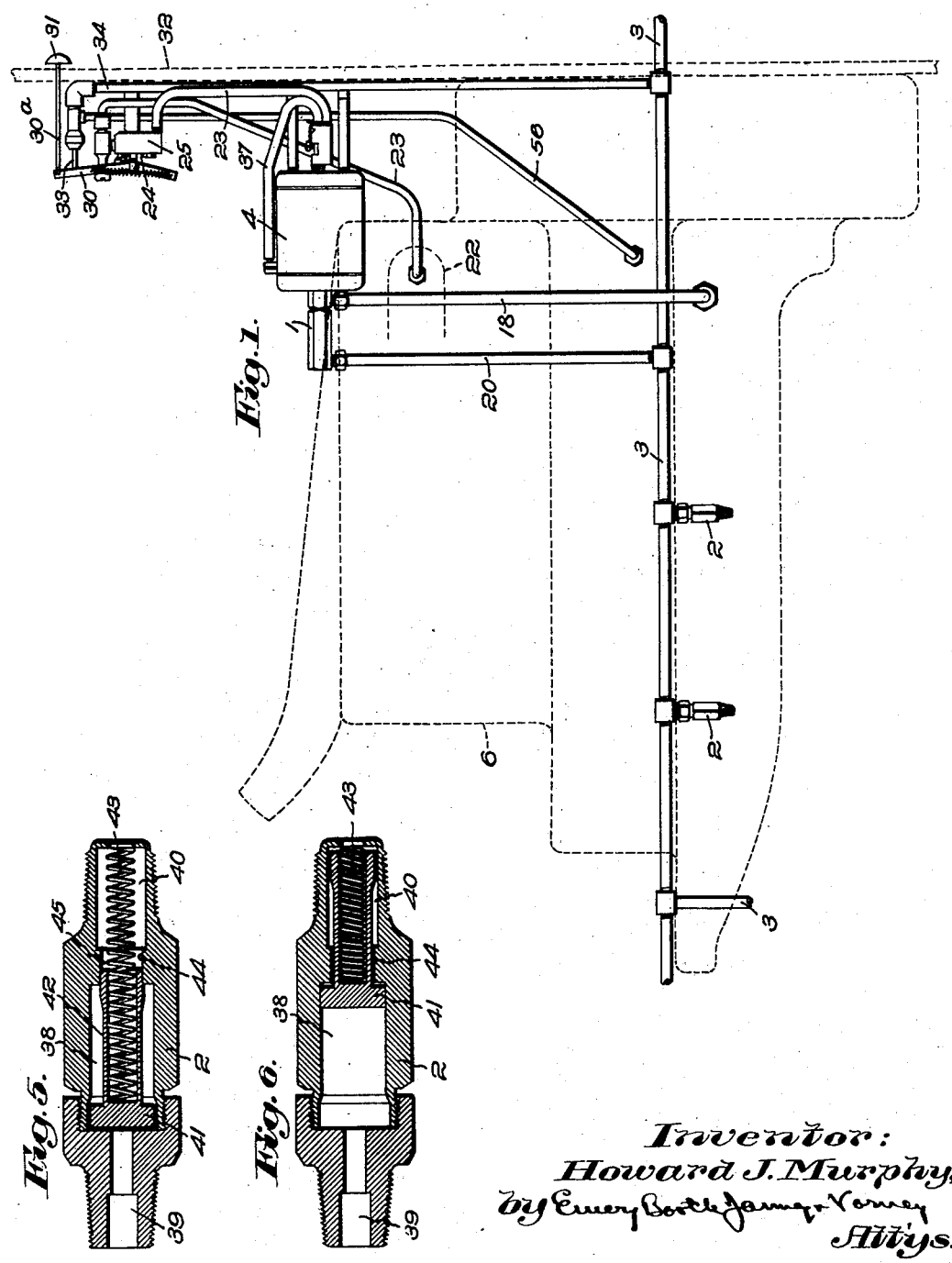
Inventor:
Howard J. Murphy,
by Emery Booth Janney Varney
Att'ys.

Oct. 11, 1932.   H. J. MURPHY   1,881,857
LUBRICATING APPARATUS
Filed Jan. 9, 1926   2 Sheets-Sheet 2
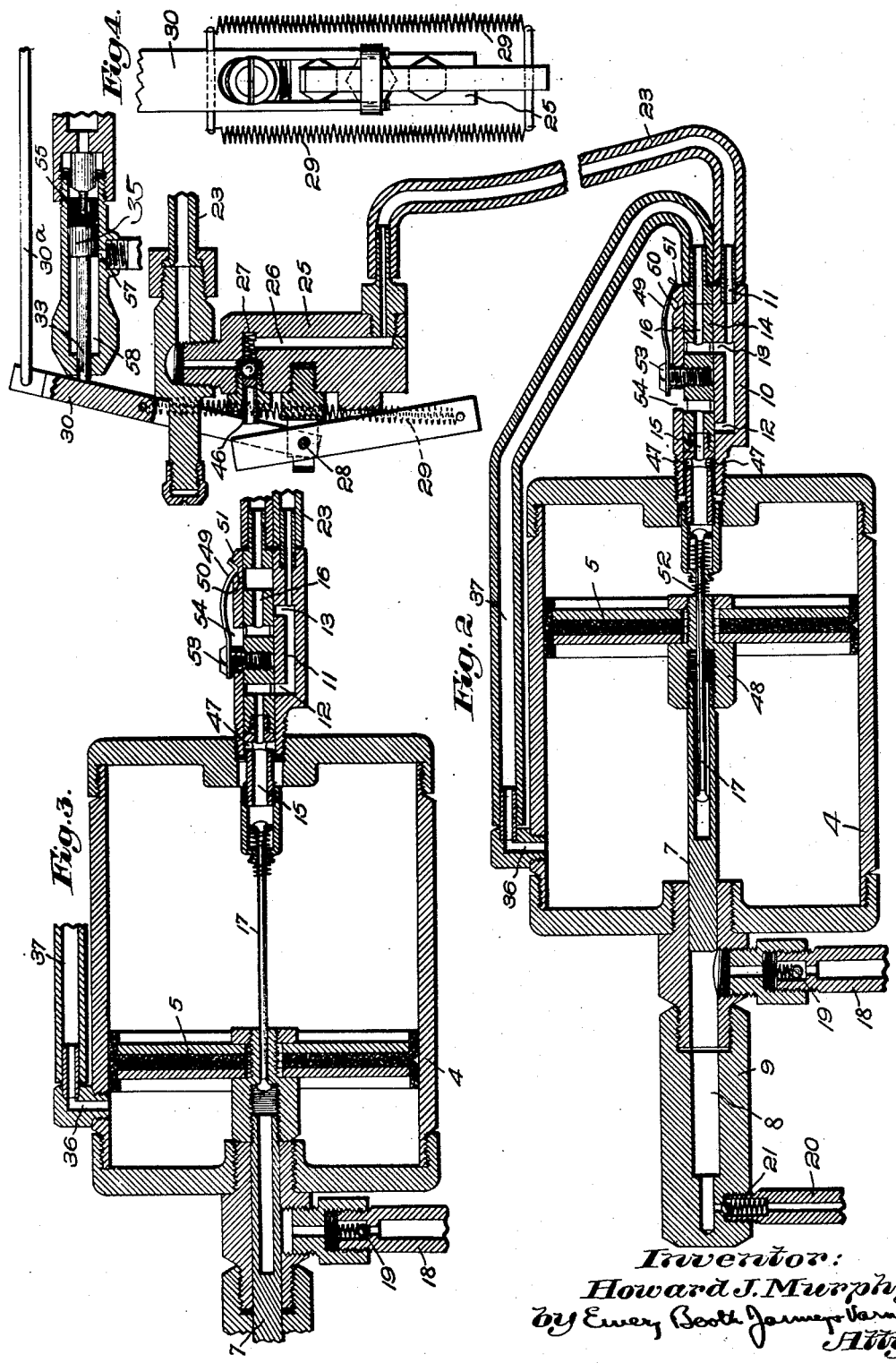
Inventor:
Howard J. Murphy,
by Ewery Booth Janney Varney
Attys Patented Oct. 11, 1932

1,881,857

UNITED STATES PATENT OFFICE

HOWARD J. MURPHY, OF READING, MASSACHUSETTS, ASSIGNOR, BY MESNE ASSIGNMENTS, TO ALEMITE CORPORATION, OF CHICAGO, ILLINOIS, A CORPORATION OF DELAWARE

LUBRICATING APPARATUS

Application filed January 9, 1926. Serial No. 80,245.

This invention aims to provide improvements in lubricating apparatus.

In the drawings which illustrate a preferred embodiment of my invention:

Fig. 1 is a side elevation of a preferred form of central lubricating system showing the location of the parts thereof relative to the engine and dash of the motor vehicle, the engine and dash being shown in dotted lines;

Fig. 2 is a longitudinal section through the suction-operated lubricant pump and the associated valve means showing the suction-operated plunger and valve means in one position;

Fig. 3 is a section through the suction pump and suction-controlling valve means of the pump shown in Fig. 2, but showing the plunger and valve means in the other operative position;

Fig. 4 is an elevation view of the valve located in the suction line between the engine and the lubricant pump; and Figs. 5 and 6 are cross-sectional views of a charge-determining lubricant device showing the two operating positions of the piston located therein.

Referring to the drawings I have shown a central lubricating system which is particularly, though not exclusively, useful in connection with lubricating the various parts of a motor vehicle.

The system which I have illustrated in Fig. 1 includes a suction operated lubricant pump, a plurality of lubricant measuring or charge determining devices or cups, a pipe system and various valve mechanisms the purposes of which will be more fully hereinafter described.

The pump 1, by which the lubricant is forced to the cups 2 through the pipe system 3, is constructed, as illustrated in Fig. 2, to provide a cylinder 4 in which is arranged a piston 5 for operation in opposite directions by suction from the engine or motor 6 shown in dotted lines (Fig. 1). The piston 5 has two cup washers facing in opposite directions so that air cannot leak from one side of the piston to the other during operation. The piston 5 carries a smaller piston 7 which operates in a chamber 8 aligned with and provided in parts 9 attached to one end of the cylinder 4. At the opposite end of the cylinder is provided a slide valve mechanism including a housing 10 having an inlet passage 11, from which branch two ports 12 and 13 respectively. Within the housing 10 is arranged a sliding part 14 having passages 15 and 16 which may communicate with the ports 12 and 13 in the manner more fully hereinafter described. The piston 5 also carries with it a slide rod 17 for operating the sliding part 14 of the slide valve.

Lubricant is conveyed from the crankcase of the engine or other desirable source to the chamber 8 through a pipe 18 leading to the chamber and in this pipe 18 is arranged a check valve 19 which permits passage of lubricant into the chamber but prevents return through the pipe. The lubricant passes out through a separate pipe 20 located at the outer end of the chamber 8. This pipe also has a check valve 21 which prevents return of lubricant to the chamber 8.

Instead of connecting the inlet passage 11, of the slide valve, directly to the intake manifold 22 (shown in dotted lines Fig. 1) I connect a tube 23 from the passage 11 to a valve device 24 and then continue the tube 23 from the other side of the device 24 to the manifold 22.

The valve device 24 is a combination hand operated and automatically operated valve mechanism for admitting suction to the slide valve device during operation of the pump and cutting it off therefrom when the cups have discharged lubricant to the bearings. I provide for this purpose, as shown in Fig. 2, a block 25 having a passage 26 therethrough which is intersected by a spring-pressed ball check valve 27 normally held against a seat by a spring actuated lever device supported upon the block 25. The lever device comprises two levers pivoted at 28 and held in either the position shown in Fig. 1 or Fig. 2 by a spring 29 secured to the outer ends of the levers at each side thereof (Fig. 4). One lever 30 is extended to receive the end of a wire 30ª connected to a button 31 on the dash 32 (shown in dotted lines) of the motor vehicle for hand operation of the lever device. This extended lever also provides an abutment against which the stem 33 of the lubricant pressure operated device may press. The lubricant pressure operated device is connected by a pipe 34 to the pipe system 3 and has a piston 35 which is pressed by the lubricant to push the stem against the lever 30, as illustrated in Figs. 1 and 2.

At the front end of the cylinder 4 is provided a passage 36 leading into the chamber in which the piston 5 operates as shown in Figs. 2 and 3. This passage 36 is connected by a tube 37 with the passage 16 in the slide valve.

Each cup 2 is located at or adjacent to the part which it is to lubricate and is connected to the pipe system so as to receive lubricant at the same time as the other cups. The body of the cup is made of two pieces screwed together, as shown in Figs. 5 and 6. Within the cup I have provided a measuring chamber 38 with an inlet passage 39 and an outlet passage 40 cooperating therewith. Within the cup I have arranged a piston 41 having a piston stem 42 normally urged toward the inlet end of the cup by a spring 43 as illustrated in Fig. 5. The free end of the piston stem is enlarged for normal engagement with the wall 44 surrounding a reduced passage 45 between the chamber 38 and outlet passage 40. The piston in this instance is all metal and has not the usual leather. However the piston is of such a diameter that it fits closely against the wall of the chamber 38. Normally the piston is located in the enlarged portion of the chamber to provide for free passage of lubricant around the piston into the chamber 38 as shown in Fig. 5.

Assuming that the engine 6 is in operation, suction is created in the intake manifold 22 and in the pipe 23 as far as the valve 27 which is normally closed. If while the engine is still running, the operator merely pulls on the button 31 the wire 30ª connected thereto will pull the lever 30 to snap the lever device from the position shown in Fig. 1 to the position shown in Fig. 2. By so doing one end of the other lever is released from a pin 46, which normally holds the check valve 27 closed, and the valve is unseated by a spring thereby opening the passage 26. Immediately suction is created in the passage 11 of the slide valve and if the piston is in the position as shown in Fig. 2 the air will be drawn out from the chamber between the piston 5 and the front end of the cylinder 4. By creating a partial vacuum at first one side and then the other side of the piston 5 while admitting air to the opposite side of the piston it will be reciprocated until the suction is cut off by closing the valve 27, as hereinafter described.

In Fig. 2 the piston is shown at the rear end of the cylinder 4 just after having moved the slide part of the slide valve to the position shown so that the port 13 is in communication with the passage 16. At the same time it will be noted that the passage 15, which is in constant communication with the opposite side of the piston through the ports 47, is opened to the atmosphere. Thus while the partial vacuum is being provided at the front side of the piston 5 atmospheric pressure is being admitted to the back side of the piston to drive it forward. As the piston moves forward it slides relative to the rod 17 until it reaches a point near the end of the stroke. Then the enlarged end of the rod is caught by the shoulder 48 to move the rod with the piston until it reaches the end of its stroke as illustrated in Fig. 3. During this last portion of the stroke the slide part 14 of the valve is pulled by the rod 17 from the position shown in Fig. 2 to the position shown in Fig. 3. The slide part of the valve is held in position by a spring finger 49 which engages detents 50 and 51. It should also be noted that the piston does not travel far enough to cross the passage 36.

In Fig. 3 the port 13 is shown cut off from communication with the passage 16 while the port 12 is shown in communication with the passage 15 to admit suction at the rear side of the piston 5 to create a partial vacuum. The passage 16 is shown open to the atmosphere so that atmospheric pressure may be admitted through the tube 37 and the passage 36 to the forward side of the piston and drive it back to the position shown in Fig. 2. The slide part 14 of the valve is shifted upon this stroke of the piston by the piston striking the cushioning spring 52 thereby pushing the slide part 14 through the medium of the spring 52. The screw 53 which holds the spring 49 is carried by the slide part 14 of the valve and provides a stop for the slide valve when moved to opposite ends of the slot 54 formed in the casing 10.

As the piston reciprocates in the manner just described, it reciprocates the smaller piston 7 to draw lubricant by suction from the crank case of the motor 6 through the pipe 18 past the valve 19 which opens as shown in Fig. 2 to fill the chamber 8. As the piston 7 moves forward it forces the lubricant out of the chamber 8 past the valve 21 and through the pipe 20 as it cannot pass the valve 19. The lubricant then passes through the entire pipe system 3 to the various cups 2 filling the chamber 38 in each cup.

The normal operation of the piston means in each cup is as follows: First the lubricant passes by or around the piston 41 into the chamber 38 as indicated in Fig. 5. The lubricant cannot pass directly through the cup 2 because of the close fit between the enlarged end of the piston stem 42 and the wall 44 as shown in Fig. 5. Therefore the chamber 38 eventually becomes filled with lubricant and the pressure of the lubricant acts upon the piston 41 to move it into the chamber 38. The piston first cuts off the passage around it to the chamber and then moves further to open a passage around the smaller part of the stem between the outlet passage 40 and the chamber 38 by urging the enlarged part of the stem out of engagement with its cooperating wall 44. During the interval between the closing of the chamber 38 and opening the chamber to the discharge passage the lubricant may leak around the piston 41 but after the passage is opened the piston forces a predetermined quantity of lubricant from the chamber to the part to be lubricated.

While the pistons 41 are being forced into the chambers to discharge the lubricant, the pressure in the pipe system increases as the lubricant is forced from the pump thereby forcing the lubricant from the cups under pressure. The lubricant pressure also acts through the pipe 34 against the cup washer 55 in the pressure operated device to push the stem 33 against the lever 30 thereby throwing the levers into the position shown in Fig. 1 to close the check valve 27, and cut off the suction from the cylinder 4 and prevent further operation of the pump. The lubricant pressure required to throw the switch is greater than required to push all of the pistons 41 in the cups 4 to the end of their strokes thereby insuring completion of the stroke of each piston before operation of the pump is automatically stopped as described. The noise occasioned by the snapping back of the switch is an audible signal to the driver that the bearings have been lubricated, and the return of the button 31 to its initial position is an independent visual signal to the same effect.

In order to relieve the pressure in the system and allow the pistons 41 in the cup to return to their normal positions after the pump has stopped. I have provided a return pipe 56 which is connected to the casing of the pressure device, as best illustrated in Fig. 2. The opening 57 out of the piston chamber 58 is normally closed but when the lubricant pressure forces the cup washer 55 forward to operate the lever 30 it passes the opening and permits the lubricant to pass through the pipe back into the crankcase.

The springs 29 at the sides of the levers are strong enough to prevent the levers being thrown over the center into the position shown in Fig. 1 by the pressure in the system which is required to operate the pistons in the cups.

From the foregoing description it will be understood that I have provided a lubricating system which is simple and may be easily and quickly placed in operation at any time that the motor of the vehicle is in operation, means being provided for automatically stopping the action of the system without aid or further thought by the operator after once starting it.

While I have shown and described a preferred embodiment of my invention it will be understood that changes involving omission, substitution, alteration and reversal of parts and even changes in the mode of operation may be made without departing from the scope of my invention which is best defined in the following claims.

I claim:

1. A central lubricating system comprising, in combination, a plurality of lubricant supply cups having means therein to prevent direct passage of lubricant therethrough, a suction operated lubricant pump for forcing lubricant through a pipe system to said cups from any suitable lubricant supply, a conduit conecting said pump with suitable suction means, a valve in said conduit normally closed to prevent operation of said pump, means for opening said valve and lubricant operated means for automatically closing said valve when the lubricant in said pipe system reaches a predetermined pressure.

2. A central lubricating system comprising, in combination, a plurality of charge determining lubricant cups, a suction operated lubricant pump for forcing lubricant through a pipe system to fill said cups and force the lubricant therefrom, a valve and valve controlling mechanism for admitting and cutting off the suction from said pump, said valve mechanism comprising a pair of pivotally mounted levers one of which normally presses upon a pin to close said valve, a hand operated device for moving said lever out of contact with said pin to release said valve and permit suction to be admitted to said pump, a lubricant operated piston device adapted to press upon said other lever to move said levers into their normal positions and thereafter to release the pressure of the lubricant in the pipe system, and spring means associated with said levers.

3. A central lubricating system comprising, in combination, a source of lubricant supply, a vacuum operated pump fed from said source of supply, a conduit connecting said pump with a bearing to be lubricated, a lubricant measuring cup in said conduit, manual means for connecting said vacuum operated pump with a source of subatmospheric pressure, and automatic means for disconnecting said pump from said source of low pressure.

4. In a centralized lubricating system of the class described, the combination of a plurality of bearings to be lubricated, lubricant measuring cups, each controlling the quantity of lubricant supplied to a bearing, a pump for forcing lubricant to said cups, a conduit system connecting said pump with said cups, a source of lubricant supply for said pump, a motor operated by fluid pressure to actuate said pump, manually operated control means for starting and stopping said motor, and automatic means for stopping said motor upon the creation of a predetermined pressure in said pipe system.

In testimony whereof, I have signed my name to this specification.

HOWARD J. MURPHY.